Aug. 30, 1966  E. J. KIRBY  3,269,480
FUEL TANK FOR MOTOR BIKE
Filed April 20, 1964  2 Sheets-Sheet 1

INVENTOR.
EDWARD J. KIRBY
BY Vernon D. Beehler
ATTORNEY.

Aug. 30, 1966          E. J. KIRBY          3,269,480
FUEL TANK FOR MOTOR BIKE
Filed April 20, 1964                    2 Sheets-Sheet 2

INVENTOR.
EDWARD J. KIRBY
BY Vernon D. Beehler
ATTORNEY.

United States Patent Office 3,269,480
Patented August 30, 1966

3,269,480
FUEL TANK FOR MOTOR BIKE
Edward J. Kirby, Manhattan Beach, Calif., assignor to Microsound Inc., Los Angeles, Calif., a corporation of California
Filed Apr. 20, 1964, Ser. No. 361,035
2 Claims. (Cl. 180—35)

The invention relates to motor bicycles and in particular a small, compact vehicle of this kind frequently designated in the trade as a miniature bike or micro-bike.

Small, compact motorized bicycles have recently been increasing in popularity. The trend has been to make small, sturdy motor bikes of this character so that they can be readily operated by combustion engines of relatively low horsepower, but which, nevertheless, evisage a frame especially adapted to motor power in contrast to a bicycle type frame of the conventional sort to which some motive power has subsequently been added.

Because of the compactness of vehicles of this kind, there has been an appreciable problem in the design and mounting of an appropriate gas tank. There is, as a practical matter, relatively little space on the usual frame, and difficulty is encountered in finding the necessary space for a gas tank which will permit it to be securely fastened in place so that it cannot be inadvertently dislodged. Problems are also encountered in finding such an appropriate place for a gas tank, far enough away from the combustion engine to minimize the likelihood of danger of igniting fumes from the gas tank by operation of the combustion engine. Furthermore, since compact motor bikes of this kind need to be sold at a relatively low price, the vehicles are as a rule stripped to bare essentials, and the problem involved, both mechanically and economically in the supplying and mounting of a gas tank is one which has heretofore not been satisfactorily solved.

It is, therefore, among the objects of the invention to provide a new and improved miniature motor bike which is extremely economical of space used for essential portions of the power plant, namely the fuel supply.

Another object of the invention is to provide a new and improved fuel tank for a miniature type motor bike which needs virtually no extra space on the frame, but which is of ample capacity.

Another object of the invention is to provide a new and improved miniature type motor bike wherein the frame structure of the vehicle itself is used for a fuel tank.

Another object of the invention is to provide a new and improved motor bike device having a fuel tank which is located at an extremely safe location even though physically adjacent the combustion engine, and wherein the filler cap, although concealed in its location while the bike is being used and being further at a safe distance from the combustion engine, nevertheless, can be made quickly and readily accessible whenever the fuel tank has to be filled.

Still further among the objects of the invention is to provide a new and improved fuel tank forming part of the frame of a motor bike wherein the possibility of surge of fuel is substantially inhibited, and wherein special means is employed to make it possible to fill the tank substantially to capacity.

With these and other objects in view, the invention consists in the construction, arrangement and combination of the various parts of the device, whereby the objects contemplated are attained, as hereinafter set forth, pointed out in the appended claims and illustrated in the accompanying drawings.

Figure 1:
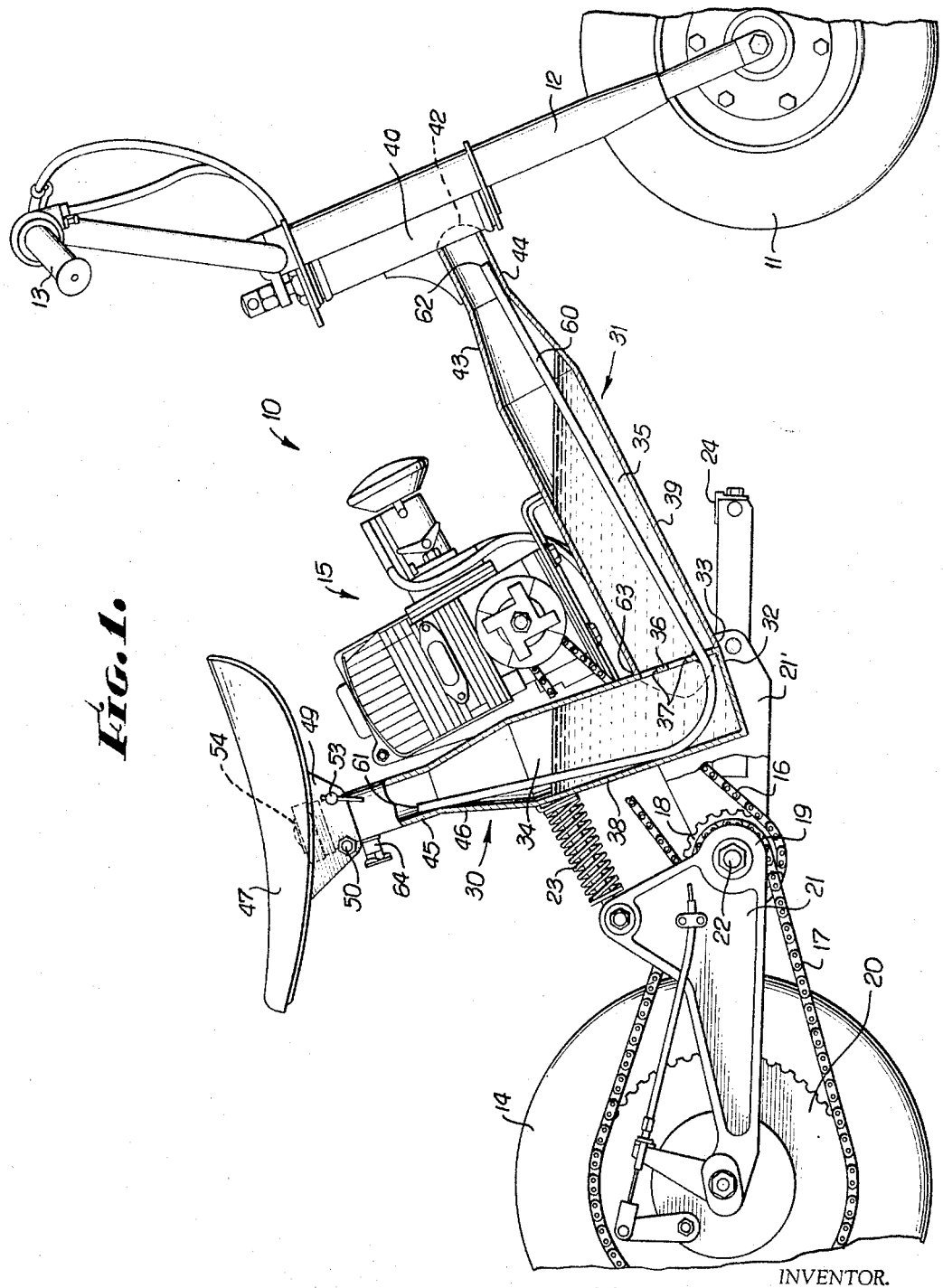
FIGURE 1 is a side elevational view of a typical miniature type motor bike partially broken away to show the structure of the fuel tank.

In an embodiment of the invention which is shown and described primarily for purposes of illustration, the vehicle is depicted as a motor bike or motorcycle consisting of a frame indicated generally by the reference character 10, a front wheel 11 at the lower end of a fork 12 manipulated by handle bars 13 and a rear wheel 14. A motor consisting of a combustion engine 15 rests upon the frame and operates through chains 16 and 17 together with sprockets 18, 19, and 20 so as to drive the rear wheel. A rear chassis 21 connected to a main chassis section 21' at a pivot point 22 is provided with a shock absorber spring 23. Foot rests like the foot rest 24 extend below the frame.

The frame consists mainly of a seat post section 30 and a base section 31. A lower end 32 of the seat post section is joined to a lower end 33 of the base section to form a V-shaped frame. The seat post section 30 is tubular as is also the base section 31 and the interior of these tubular sections form a fuel tank. More particularly within the seat post section is a fuel chamber 34 and within the base section 31 is a fuel chamber 35 interconnected with each other so that together they form the fuel tank for the vehicle. A baffle plate 36 separates the fuel chambers to an extent limited by the size of flow apertures 37.

It is significant to note that a portion 38 of the seat post section 30 is relatively large in diameter over that portion of it which contains the fuel chamber 34. The same relatively large size holds true for a portion 39 of the base section 31 within which is located the fuel chamber 35. By making these sections of relatively large diameter, the wall material of the sections can be kept relatively thin while at the same time adding to the strength and rigidity of the frame because of their larger diameter. Both of these factors contribute materially to making it possible to provide a fuel tank of relatively large capacity which requires no special allotment or provision of space on the vehicle. In fact by making the fuel tank large enough to provide adequate capacity, the structural features involving strength, ruggedness and rigidity are at the same time enhanced.

At the forward and upper end of the base section a steering head 40 is attached, the steering head in turn supporting the fork 12 and handle bars 13. The steering head provides a closed end surrounded by a liquid-tight welded seam 42 thereby closing off the corresponding end of the fuel chamber 35. A progressively narrowing portion 43 joins the portion 39 with a short tubular portion 44. Similarly, at the upper end of the seat post section there is provided a relatively short tubular portion or neck 45 joined to the portion 38 by a narrowing section 46. The neck 45 is frequently designated as a filler neck. In the present instance not only is the said portion 45 a filler neck but it also consists of a structural element of the frame itself and a means for supporting a seat 47. Bracket plates 48 and 49 attached to the underside of the seat 47 are pivotally attached to the neck 45 by means of a pivot pin 50. The pivot pin is contained in a sleeve 51 which is a permanent part of the upper end of the neck 45.

Figure 2:
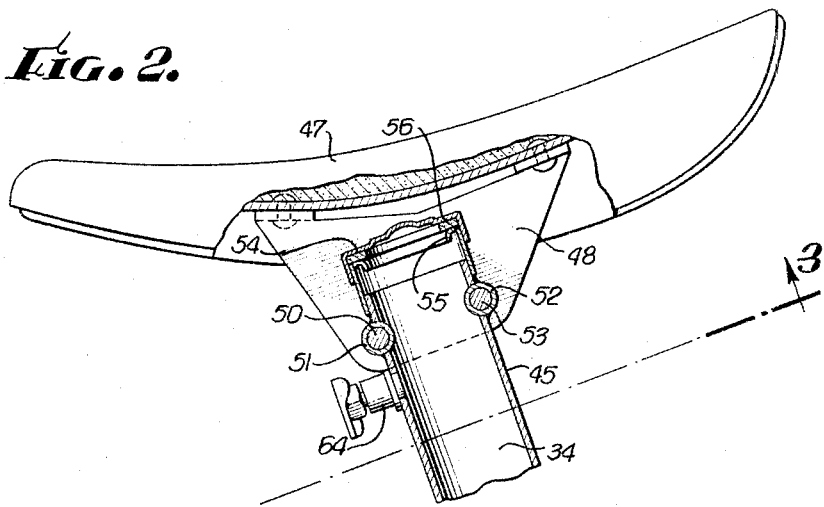
FIGURE 2 is a fragmentary side elevational view of the upper end of the fuel tank partially broken away to show the filler neck and cap.
Figure 3:
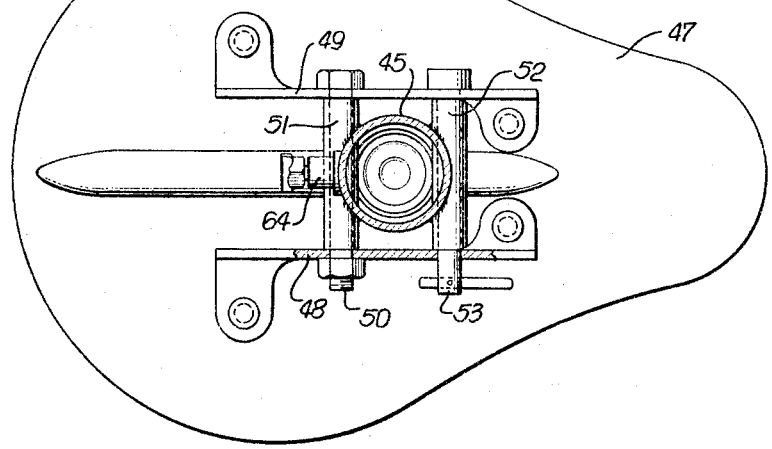
FIGURE 3 is a cross-sectional view taken on the line 3—3 of FIGURE 2.

To secure the seat releasably in the operative position shown in FIGURE 2, there is provided a similar sleeve 52 on the opposite or front side of the neck 45 into which is extended a removable lock pin 53. When the seat is to be tilted from the position of FIGURE 2 to the position of FIGURE 4, the removable lock pin is disengaged and the seat pivoted backwardly about the pivot pin 50 as a center whereby to provide access to the neck 45.

A filler cap 54 is secured over the upper end of the neck in a substantially conventional fashion and fits over a flange 55 upon which it is releasably sealed by the presence of an annular sealing gasket 56.

Attention is further called to a vent tube 60 which has one opened end 61 located within the neck 45 and the other open end 62 extending into the highest portion of the fuel chamber 35, namely, within the short tubular portion 44.

Figure 4:
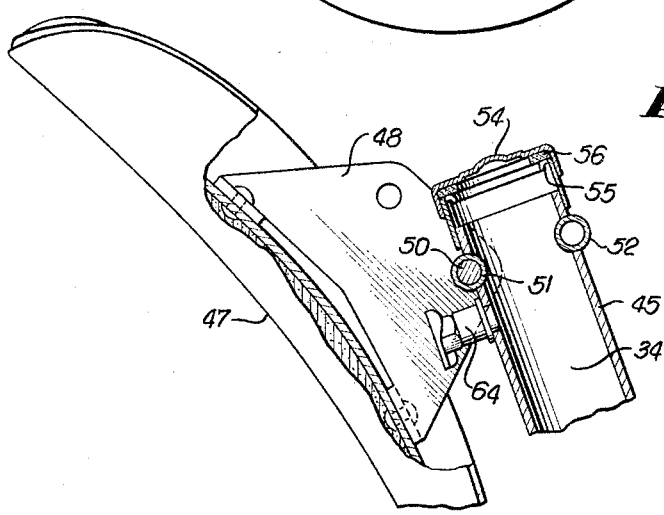
FIGURE 4 is a view similar to FIGURE 2 but showing the seat removed to expose the filler cap.

When it becomes desirable to fill the fuel tank, the removable lock pin 53 is removed and the seat tilted from the position of FIGURE 2 upwardly and backwardly to the position of FIGURE 4. The filler cap 54 is then removed and the fuel filling nozzle inserted into the neck 45. As fuel flows into the fuel chamber 34 it passes into the flow apertures 37 of the baffle 36 and thence into the fuel chamber 35. This, of course, traps air and gases as soon as the level of fuel in the fuel tank raises above a junction point 63 between the sections 30 and 31. Because of this, air or gases trapped in the upper end of the base section 31 are gradually passed into the open end 62 of the vent tube 60 and from there downwardly through the tube and upwardly to the open end 61. In this manner air, gases or both are vented from the fuel chamber 35 while it is being filled and permit the chamber, if need be, to be virtually completely filled. A partial fuel level only is shown in FIGURE 1. After the filling operation has been completed, the cap 54 is replaced and the engine 15 is ready for operation. There is, of course, a fuel line (not shown) from adjacent the bottom of the fuel tank to the combustion engine but inasmuch as fuel lines of this general sort are conventional and well known, it has been omitted from the drawings for purposes of clarity. After the filler cap 54 has been replaced, the seat is then tilted to operating position, as shown in FIGURE 2, and the removable lock pin 53 is reinserted to hold it in that operating position.

It is of consequence to note that the upper end of the neck 45 where the filler cap 54 is attached is removed a substantial distance from the combustion engine and is clear and accessible as well as free for ventilation during a filling procedure. As a further precaution there is provided a vent relief valve 64 at the very top of the neck 45 which becomes operative when the filler cap 54 is in place. In this way air is admitted back into the fuel tank as the fuel is drawn therefrom by the engine.

Moreover, located as shown the fuel tank is in a very handy location close to the combustion engine as well as being easily accessible for filling. At the same time the tank is compact and in a well protected position as a fuel tank should be. It is, moreover, located at substantially the center of mass of the motor bike as a whole so that the weight of the fuel, whether the tank be full or empty, will have no appreciable effect upon the balancing of the vehicle.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. In a fuel tank for a motor bike including a frame having a tubular seat post section, a tubular base section joined at a rearward end thereof to a lower end of said seat post section, and a seat mounted on the upper end of said seat post section, the combination comprising the hollow interiors of said sections, a perforated baffle including a plurality of flow apertures extending through said lower end of the seat post section at said rearward end of the base section and within the region defined by the junction of said sections, the upper end of said seat post section comprising a filler neck for the tank, a removable cap for said neck, a vent relief valve operatively mounted on said filler neck near said movable cap whereby to admit air as the fuel stored in the tank is drawn therefrom by said engine, and a pivot connection between said seat and said seat post section whereby said seat is tiltable from a position overlying said cap to a position clear of said cap when the tank is to be filled, and a vent tube extending through the seat post section from a location adjacent said vent relief valve thence through the base section to a location at the forward end of said base section whereby to vent trapped air and gases during filling of said tank.

2. A motor bike comprising a frame including a tubular seat post section, and a tubular base section joined at a rearward end thereof to a lower end of said seat post section, a steering head at the foreward end of the base section, a traction assembly mounted on the frame rearwardly of said seat post section, a seat mounted on the upper end of said seat post section, and a combustion engine supported by said frame above the base section and foreward of the seat post section, said sections having interconnected hollow interiors whereby to provide a fuel tank comprising a fuel chamber in each section, and a perforate baffle including a plurality of flow apertures extending through said lower end of the seat post section at said rearward end of the base section and within the region defined by the junction of said chambers, the upper end of said seat post section comprising an upwardly disposed tubular portion having a cross sectional area less than that of said fuel chambers and forming a filler neck for said fuel tank, a narrowing section coupled at its smaller and larger ends respectively to said tubular portion and to said fuel chamber of the post seat section, a removable cap for said filler neck, a vent relief valve operatively mounted on said tubular portion intermediate said removable cap and said narrowing section, whereby to admit air as the fuel stored in said tank is drawn therefrom by said engine, and a pivot connection between said seat and said seat post section whereby said seat is tiltable from a position overlying said cap to a position clear of said cap when the tank is to be filled, and a vent tube extending through the fuel chamber in the seat post section from a location adjacent said vent relief valve thence through the base section to a location at the forewardmost end of said base section whereby to vent trapped air and gases during filling of said tank.

References Cited by the Examiner

UNITED STATES PATENTS

| | | | |
|---|---|---|---|
| 714,571 | 11/1902 | Freed | 180—35 X |
| 739,664 | 9/1903 | Freed et al. | |
| 1,371,783 | 3/1921 | Goudard et al. | 180—35 |
| 2,508,124 | 5/1950 | Stephenson | 280—5 |

FOREIGN PATENTS

| | | |
|---|---|---|
| 953,421 | 5/1949 | France. |
| 845,615 | 8/1952 | Germany. |
| 694,200 | 7/1953 | Great Britain. |
| 530,452 | 7/1955 | Italy. |

KENNETH H. BETTS, *Primary Examiner.*